July 19, 1932.  E. J. MINER  1,868,018
PRESSURE OR GRAPHIC GAUGE PROTECTOR
Filed Oct. 9, 1929
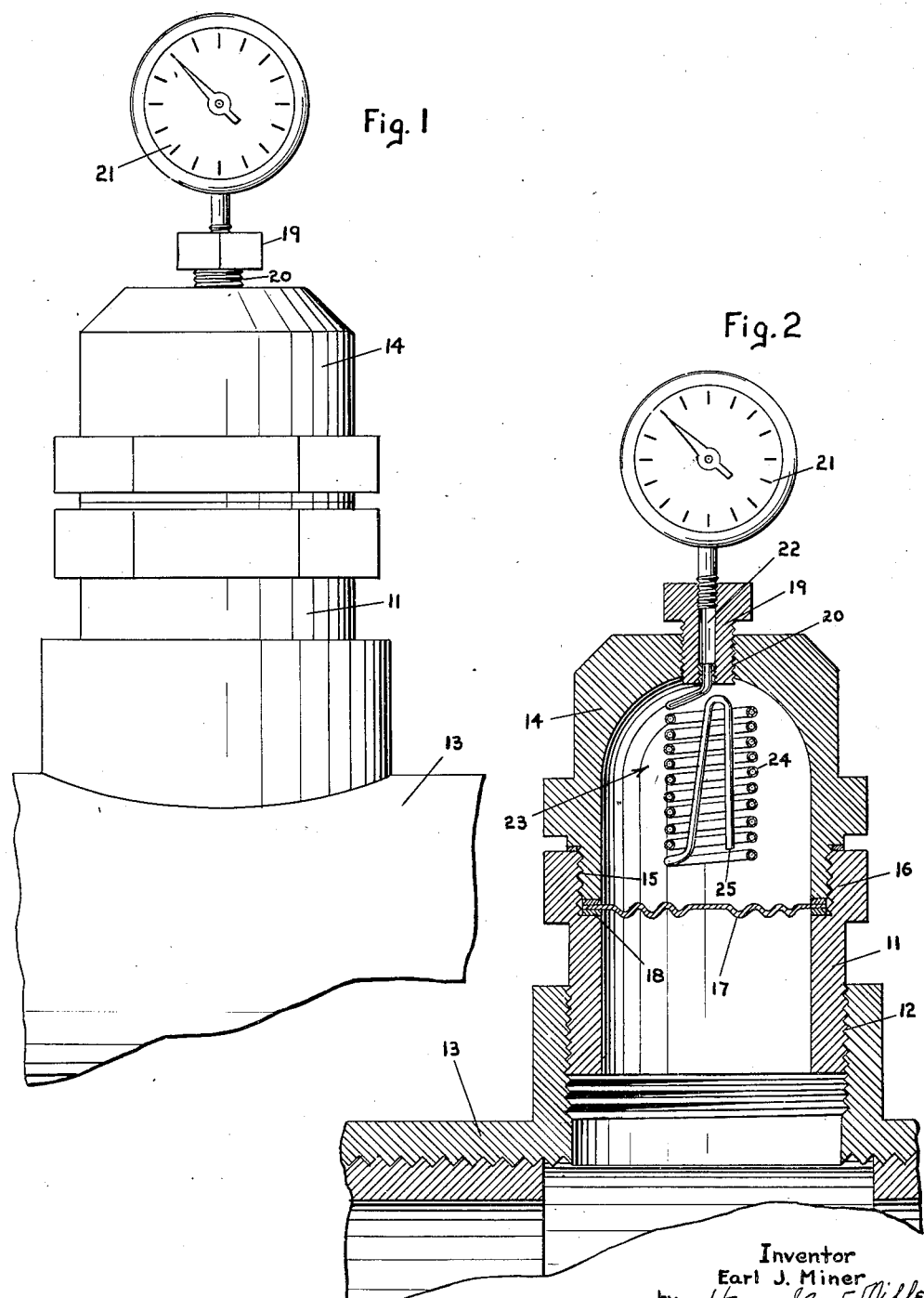
Inventor
Earl J. Miner
by Hazard and Miller
Attorneys Patented July 19, 1932

1,868,018

UNITED STATES PATENT OFFICE

EARL J. MINER, OF LOS ANGELES, CALIFORNIA

PRESSURE OR GRAPHIC GAUGE PROTECTOR

Application filed October 9, 1929. Serial No. 398,430.

My invention pertains to a pressure or graphic gauge protector, in which such gauge is protected from damage by foreign matter carried in the fluid which operates the gauge and which matter foreign to the fluid may cause damage to the mechanism of the gauge.

In many lines of operations it is necessary to obtain the pressure of a fluid either by a direct pressure gauge or by a graphic type of gauge and in many cases these fluids are highly charged with matter foreign to the fluid. For instance, in mud pumping for pumping the slushing or circulating fluid for deep well drilling, it is necessary to utilize pressure gauges and as this fluid carries a large amount of mud and sand, the gauges become clogged very rapidly, thus destroying the gauge. There are many other types of work in which a liquid carries a solid or sedimentary substance which if the gauge is directly connected to the fluid, such gauge soon becomes inaccurate or inoperative.

My invention may also pertain to gauges operating by a gas pressure, in which gases may carry in suspension considerable foreign matter, which if introduced into the gauge would be damaging to the action of the gauge. An object of my invention therefore is a protector which separates the gauge from the fluid it is desired to test and applies the pressure indirectly through the medium of a second fluid; this second fluid operating directly on the gauge.

To obtain this result I utilize a structure having a pressure chamber therein and preferably with a flexible diaphragm exposed to the fluid to be tested, which fluid may be stationary or in motion. The gauge is connected to the pressure chamber and such pressure chamber is preferably filled with a free flowing non-compressible liquid whereby a pressure develops on the side of the diaphragm carrying the fluid, the pressure of which is desired. This pressure is communicated through the fluid in the pressure chamber and hence to the gauge.

In many types of industrial and scientific operations it is desirable to obtain a more or less average pressure of the fluid and to eliminate the considerable pulsations of pressure which occur for instance, in pumps in which at the moment of greatest pressure the pressure for a period of short duration may be very materially higher than that of the average pressure of the liquid. Also at other periods the pressure may fall considerably below the average. An object of my invention therefore is to effect a more or less equalization of the excess of the maximum and minimum pressures and obtain a more or less average pressure reading; there being however, possibly certain fluctuations depending on the duration of the maximum and minimum pressures and their difference from the average as well as from the fluid being used to determine the pressures.

A more detailed object of my invention in this feature is in flowing a fluid to operate a pressure gauge, which fluid is retarded in its action during the maximum pressure and will maintain the pressure for a short period after the average has been passed and during the period of minimum pressure. An object of my invention in this connection is in overcoming the vibration of a gauge due to rapidly changing momentary pressures. A practical way of obtaining this result is to utilize what I term a choke coil formed of small bore piping and connecting the pressure fluid with a pressure gauge of a suitable type. The fluid is required to exert a pressure through the bore of the tubing which may be made of considerable length and due to convolutions, gives a resistance to the registration of the maximum presure and also tends to hold the pressure at the mean during the short period of minimum pressure as when a fluid is under a pumping action.

Another object of my invention is combining the feature of protecting the fluid from sedimentary material or other material carried in suspension in the fluid and obtaining the equalization of pressure. Therefore I may employ a structure having a pressure chamber with a flexible diaphragm, the fluid to be tested operating against one side of the diaphragm and the gauge is on the other side with the tubular choke coil mounted in the pressure chamber and communicating with the gauge.

My invention is illustrated in the accompanying drawing, in which,

Fig. 1 is an elevation of an application of my invention;

Fig. 2 is a diametrical section of the structure of Fig. 1.

In connection with my invention I utilize preferably a nipple 11 which is preferably externally threaded at the lower portion 12. This is illustrated as being connected to a pipe line 13 or any suitable part of a pump or other structure having either the fluid to be tested in motion or stationary. A cap structure 14 is illustrated as having external threads at its lower portion 15, these engaging internal threads on the upper part 16 of the nipple 11. A diaphragm 17, preferably formed of metal, with corrugations is caught between the nipple and the cap, there being suitable fluid tight ring packing 18.

A tubular fitting 19 is illustrated as being threaded as indicated at 20, through the top of the cap and this has a gauge 21 connected to the upper end of the bore 22, this being illustrated as a pressure type of gauge. Connected to the lower end of the bore feeding there is a tubular choke coil 23. This is illustrated as having a series of coils 24 and with an open end 25. The coil may be of considerable extent and the bore of a size found satisfactory in practice for testing different types of fluid. The space inside the cap is designated as a pressure chamber and is separated from the fluid to be tested by the diaphragm 17. The pressure chamber is filled with preferably a liquid such as oil or glycerine.

In the operation of my invention the fluid such as a liquid slushing mud for hydraulic filling operations, may flow through the pipe or chamber 13 which if desired may be a part of a pipe carrying the fluid with suspended matter therein or part of a pump itself. One side of the diaphragm 17 is therefore subjected to the action of the liquid carrying the suspended or sedimentary material or other materials or liquids which may be deleterious to the gauge, but the pressure is instantly transmitted from the liquid under test to the pressure fluid in the pressure chamber, which latter fluid as it fills the tubular choke coil conveys the pressure to the gauge. It is manifest that as the changing momentary pressures have to be communicated through the circuitous passage of the tubular choke coil, that there is a retardation of the registration of these instantaneous or momentary pressures. Therefore the gauge is prevented from being subjected to what might be termed a vibratory action due to pumping of the liquid or other sudden and momentary changes. Therefore the gauge instead of oscillating between the extreme maximum and the extreme minimum pressures, maintains a more or less indication of an average or mean pressure, fluctuating of course one way or the other depending on the amount of difference between the mean and the maximum and minimum and the duration of these latter pressures.

It will be seen therefore that as the gauge is subjected to the action of fluid carrying the deleterious material that the gauge may be kept in perfect working order, thus giving accurate readings. It is obvious that my installation with proper types of gauges could be used for interpreting gaseous pressures of gases carrying suspended matter or matter deleterious to the gauge or in which the gases themselves might have a deleterious action on the gauge. Also my gauge can be used in testing the pressure of liquids which liquids might have a chemical action on the component parts of the gauge if they were brought directly in contact therewith.

Various changes may be made in the principles of my invention without departing from the spirit thereof as set forth in the description, drawing and claim.

I claim:

A gauge protector comprising a nipple and a cap, a diaphragm supported on the nipple and held in position thereon by the cap, said nipple being adapted to be connected to a source of pressure, said cap providing an interior chamber above the diaphragm, a choke tube disposed wholly within said chamber and leading to an outlet in the cap, a pressure gauge connected to the choke tube, and a fluid in the chamber and choke tube for transmitting pressures from the diaphragm to the gauge.

In testimony whereof I have signed my name to this specification.

EARL J. MINER.